June 9, 1964 R. C. LAMY ETAL 3,136,977

COMPARING MATRIX

Filed Dec. 23, 1960

3 Sheets-Sheet 1

INVENTORS
RICHARD C. LAMY
ALLAN J. ATRUBIN

BY [signature]

ATTORNEY

June 9, 1964 R. C. LAMY ETAL 3,136,977

COMPARING MATRIX

Filed Dec. 23, 1960

3 Sheets-Sheet 2

United States Patent Office 3,136,977
Patented June 9, 1964

3,136,977
COMPARING MATRIX

Richard C. Lamy, San Jose, Calif., and Allan J. Atrubin, Endicott, N.Y., assignors to International Business Machines Corporation, New York, N.Y., a corporation of New York Filed Dec. 23, 1960, Ser. No. 78,105
11 Claims. (Cl. 340—149)

The present invention relates generally to electronic logical systems and more particularly to electronic systems for comparing and characterizing a plurality of input signals.

In various information processing or control circuits it is desirable to characterize several signals with respect to one another and/or with respect to some predetermined standard. In certain character recognition systems, for example, a plurality of signals may be generated each representative of the probability that a particular character is present at a recognizing station. To determine which character is present it is necessary to compare the several signals to determine which is the smallest (or the largest) and whether it is sufficiently smaller (or larger) than any other. It is also necessary to compare it with some standard signal to determine whether the represented character is valid at all. Other data processing or control systems may require similar characterization for other purposes.

It is an object of the present invention to provide novel circuitry for comparing several signals to determine their respective relations, and for indicating which of the several signals is larger or smaller than the others.

Another object of the invention is to provide a system for indicating whether the largest or smallest signal of a plurality of signals differs from each other signal by at least a fixed predetermined amount.

Still another object of the invention is to provide a system for indicating whether the largest or smallest signal of a group differs from all others of the group by at least a predetermined proportional amount.

A further object of the invention is to provide a system of the character described which is also capable of determining whether the largest or smallest signal of a group is larger than or smaller than a predetermined standard signal.

More specifically, it is an object of the present invention to provide a signal comparing and characterizing matrix.

The foregoing and other objects of the invention are accomplished by providing a plurality of signal comparing cells arranged in a matrix of rows and columns. Each cell is adapted to compare two signals. As many rows and columns of cells are provided as there are signals to be characterized. Each different signal is applied as an input to the cells of one row and as an input to the cells of one column. The cells of a given column compare the signal associated with that column to the signals associated with each different row.

The one cell in each column which is also common to the row associated with the same input signal is not required in the comparison of input signals since its row and column inputs are identical. Accordingly, one of its inputs is supplied by a predetermined standard signal, and it functions to compare the signal associated with its row or column to the said standard.

A preferred embodiment of the invention features bistable magnetic cores as the comparing cells. Novel circuit arrangements of interconnected winding means are provided to apply the signals to be characterized to the cells and to indicate the results of the characterizations.

Accordingly, it is also an object of this invention to provide a magnetic core matrix having a novel selection winding arrangement for applying different combinations of input signals to the magnetic cores therein.

An additional object of the invention is to provide a magnetic core matrix having novel interrogation and sensing means for indicating the responses of the cores therein to input signals.

The foregoing and other objects, features and advantages of the invention will be apparent from the following more particular description of preferred embodiments of the invention, as illustrated in the accompanying drawings.

Figure 1:
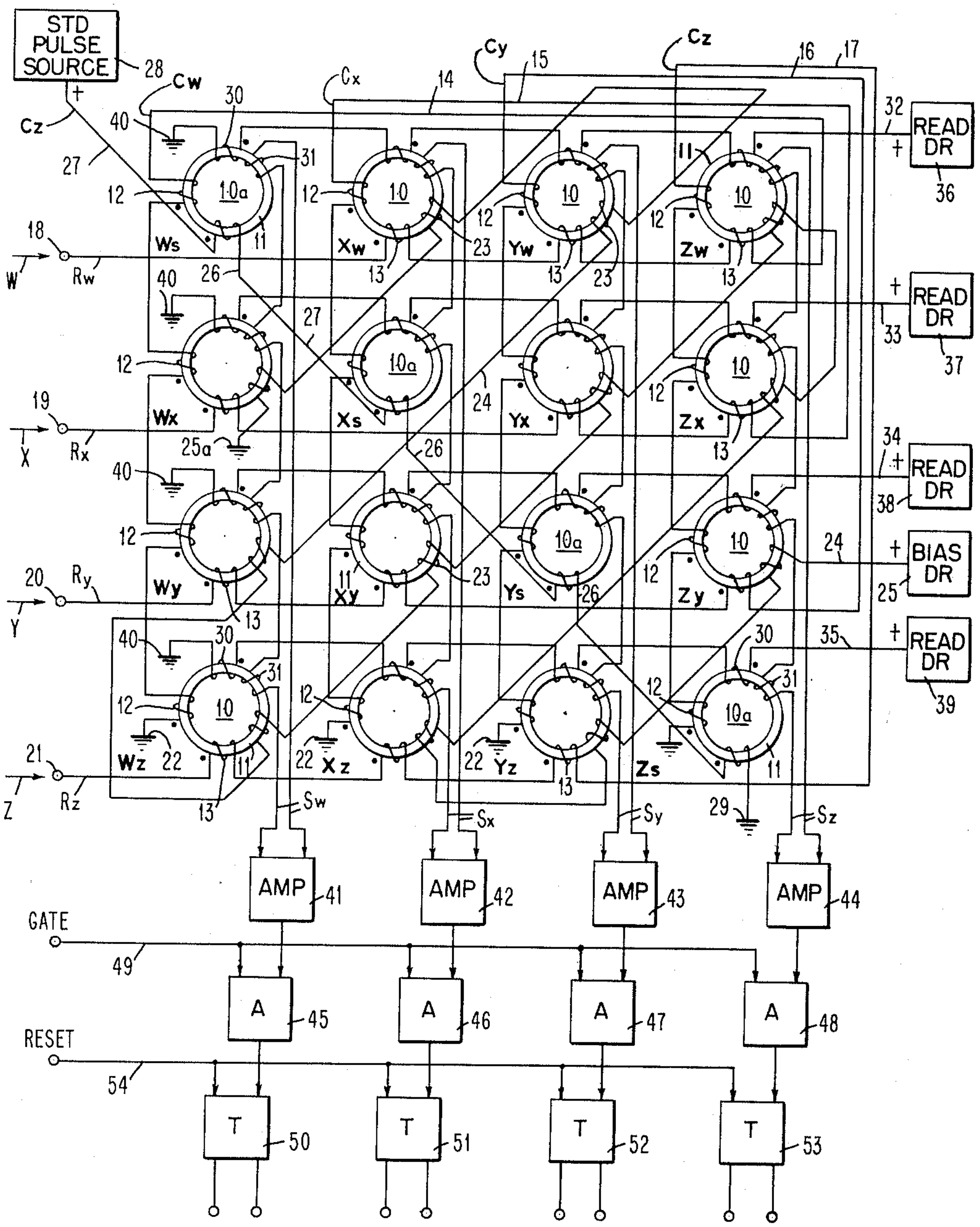
FIGURE 1 is a circuit diagram of a matrix embodying the present invention.

Referring now in detail to the drawings, there is shown in FIGURE 1 an embodiment of the invention adapted to compare and characterize four separate signals, identified as W, X, Y and Z, each in the form of a current of unknown magnitude. The comparing and characterizing means comprises a plurality of cells 10 arranged in a matrix of four rows and four columns, one row and one column for each input signal W, X, Y and Z. Each cell has at least two information inputs, one of which may be termed a row input and the other a column input. Three of the cells in each column compare the signal associated with that column, for example, signal Z associated with column Z, to the other three signals W, X and Y associated with three of the rows intersecting that column. The fourth cell in each column, the one which is common to the row and column both associated with the same input signal, has its row input provided from a standard signal source and compares the signal associated with its column to that standard signal. The cell in each column which performs this function is identified in FIGURE 1 by the reference character **10*a*. It will be observed that the physical locations of the several cells 10*a*** in the matrix describe a diagonal line therein.

With the arrangement just described, full comparison of each of the signals W, X, Y and Z with each other is possible. Each two signals, for example W and X, are compared in two cells. The cell common to column W and row X compares signal W to signal X and the cell common to column X and row W compares signal X to signal W. Each cell is required to answer only the single logical question: "Is the column signal smaller than (or, in some embodiments, 'larger than') the row signal?" If one of the signals is larger than the other, then one of the two cells will give an affirmative indication and the other will give a negative indication. If the signals are equal within the tolerances provided, then both cells will give a negative indication.

While the invention is shown and described herein as comprising four rows and columns of cells for comparing and characterizing four signals, it is not intended that the invention be limited to matrices of this size. Any number of signals may be accommodated by providing a matrix of proper dimensions. For example, ten signals may be compared in a matrix of ten rows and ten columns; fourteen signals may be compared in a matrix comprising fourteen rows and fourteen columns; etc.

The comparing cells shown and described include bistable magnetic cores as principal components thereof. While other devices capable of comparing one signal against another and indicating whether the said one is smaller (or larger) than the other may be employed in the matrix system disclosed herein, it has been found that magnetic cores possess properties which make them particularly advantageous.

Figures 2, 3, 4:
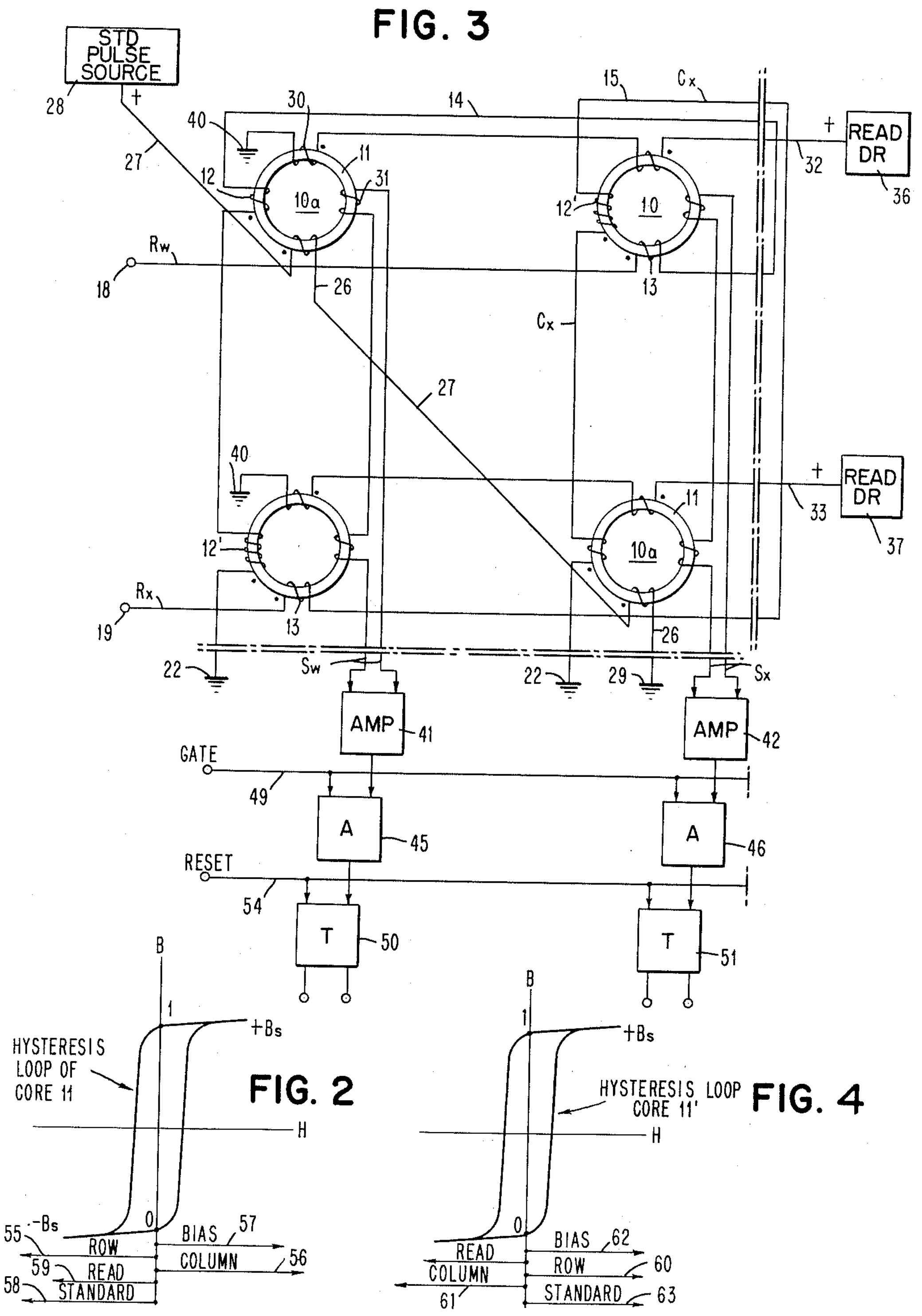
FIGURE 2 is an illustration of a typical hysteresis loop of a core suitable for use with the invention.
FIGURE 3 is a partial circuit diagram of a modified embodiment of the invention.
FIGURE 4 is a hysteresis diagram similar to FIGURE 2 but illustrating the relationship of forces when certain winding polarities are reversed.

FIGURE 2 of the drawings illustrates the hysteresis loop of a magnetic core suitable for use with the present invention. Cores having hysteresis characteristics of this type are referred to as bistable for the reason that they have two distinctly different stable states of magnetic remanence. These states are identified in the hysteresis loop of FIGURE 2 by the numerals 1 and 0, in accordance with customary binary terminology. Hereinafter, they will be referred to as the "1 state" and the "0 state." For the purposes of the following description the 0 state will be considered as the reset or cleared state. It will be understood, of course, that this is a purely arbitrary choice and that either state might be so considered.

The magnetic state of a bistable core may be altered at will by application of a magnetic force thereto by means of a current carrying winding coupled to the core. The magnetic force may exist in either of two opposite directions along the H axis of the diagram of FIGURE 2. A force of sufficient magnitude directed to the right along the H axis will drive the core to a positive saturation condition $+B_s$ and a force of sufficient magnitude and directed to the left will drive the core to a negative saturation condition $-B_s$. The core will remain in saturated condition only so long as the force exists, however, and when the force is removed the core will traverse its hysteresis loop to the nearest remanence state; the 1 state if driven to $+B_s$ or the 0 state if driven to $-B_s$. In describing alterations of the state of a core it is convenient to ignore the excursions to the points $+B_s$ and $-B_s$ and simply state that an applied force drives the core to one of its remanence states.

It will be observed that throughout the drawings several windings associated with the magnetic cores are provided with a black dot adjacent one end. The dots indicate the sense of the windings. According to the notation adopted herein, positive current flowing into the dotted end of a winding will drive the associated core from the 1 state to the 0 state. Positive current flowing into the undotted end of a winding will drive the associated core from the 0 state to the 1 state.

Returning now to FIGURE 1, it will be observed that the core 11 of each of the cells 10 or 10*a* has coupled thereto a winding 12 which provides the column input for the cell. The windings 12 of all cores 11 in each different column are connected in series aiding to provide column coils C*w*, C*x*, C*y* and C*z* for the several columns. The cores 11 of the cells 10 are also provided with windings 13 which provide the row inputs therefor. The windings 13 of each different row are connected in series aiding to provide row coils R*w*, R*x*, R*y* and R*z* for the several rows. The cells 10*a*, one in each row, are not coupled by the row coils, although they are coupled by the column coils.

Since it is desired to supply each of the unknown input signals W, X, Y and Z both to one column and one row of cells 10, connectors 14, 15, 16 and 17 are provided to couple the row coils R*w*–R*z* in series with their corresponding column coils C*w*–C*z*. At one end of each of this series combinations, an input terminal 18, 19, 20 or 21 is provided. The opposite end of each series combination is terminated in a suitable manner as indicated by the ground symbols 22. This series connection of corresponding row and column coils provides coincident energization of all column and row input windings 12 and 13 associated with a given input signal from a single input terminal 18, 19, 20 or 21.

The cores 11 of the cells 10 are also provided with bias windings 23, the purpose of which is explained later herein. The several bias windings 23 are connected in series aiding to form a bias coil 24 which threads the entire matrix, except for the cells 10*a*. One end of the coil 24 is connected to the positive output of a bias pulse generator 25 and the other end is terminated in a suitable manner as symbolically represented by the ground symbol 25*a*. The bias pulse generator may be any suitable device capable of producing, when activated, a direct current of predetermined magnitude.

The cells 10*a* in the matrix are employed to compare the input signals applied to their respective column input windings 12 with a standard signal, as earlier mentioned. Accordingly, the cores 11 of each of these cells has a standard signal input winding 26 coupled thereto. The windings 26 of the several cells 10*a* are connected in series aiding to form a coil 27. The coil 27 is connected at one end to the positive output terminal of a pulse generator 28 adapted when activated to produce a current signal of predetermined magnitude. The opposite end of the coil 27 is terminated in a suitable manner as indicated in FIGURE 1 by the ground symbol 29.

In addition to the several windings already described, each core 11 has two additional windings 30 and 31 coupled thereto. The windings 30 are interrogation or readout windings and those of each row are serially connected to form row interrogation coils 32, 33, 34 and 35. Each of the coils 32–35 is connected at one end to a separate pulse generator 36, 27, 38 or 39, as shown, and at the other end to terminating means indicated by the ground symbols 40. The windings 31 are output windings through which changes of state of the cores 11 are sensed. The output windings are connected in a plurality of column sense coils indicated by the reference characters $S_w$, $S_x$, $S_y$ and $S_z$. Each of the sense coils $S_w$–$S_z$ represents the input signal associated with the column to which it is coupled. The subscript attached to the reference character of each sense coil identifies the particular input signal represented.

The sense coils $S_w$–$S_z$ are coupled to amplifiers 41, 42, 43 and 44 which serve to amplify the output signals developed in the windings 31 when flux reversals occur in the associated cores 11. Each of the amplifiers 41–44 feeds one input of a conventional AND gate 45, 46, 47 and 48. The second input of each gate 45–48 is provided by a control line 49. The purpose of the gates 45–48 is to prevent transmission of signals from the amplifiers 41–44 except during application of a control signal to the gate line 49.

The output of each gate 45–48 is coupled to an input terminal for an associated register trigger 50, 51, 52 or 53. Triggers 50–53 are "set-reset" triggers of the non-complementing type, that is to say, each has two separate inputs, one which sets the trigger to the ON state and one which sets it to the OFF state. Each also has two separate outputs, one of which produces a signal when the trigger is ON and one to produce a signal when it is OFF. Triggers of this type are well known in the art, so no description of the details thereof will be made herein. A set-reset trigger is set by a set signal and reset by a reset signal and emits continuous 1 or 0 outputs according to its set or reset condition. One example is disclosed in U.S. Patent 2,947,882, August 2, 1960, Chou, Transistor Trigger Circuits, IBM. In the embodiment of the invention shown in FIGURE 1, the outputs of the several gates 45–48 are connected to the OFF inputs of triggers 50–53 and the ON inputs are coupled to a reset control line 54. The triggers are thus reset in the ON state and are turned OFF by voltages induced in the output windings 31. Other types of registers, for example magnetic core registers, could be used.

It has been mentioned earlier herein that the matrix is capable of determining (*a*) the smallest of a plurality of input signals, or (*b*) the largest of said plurality. Which form of operation exists depends upon the relative polarities of the row and column input windings 12 and 13. In the embodiment shown in FIGURE 1, the polarities are arranged to provide indications of the smallest signals. The operation of the matrix in this manner will now be described.

Before passing to a description of the operation of FIGURE 1, note should be made of the characteristics of the cores 11. It has already been stated that these elements are bistable. From the diagram of FIGURE 2 it will be seen that the cores 11 are not necessarily of the so called "square loop" type, i.e., they need not have well defined switching thresholds as is the case with conventional memory cores. The cores 11 are selected so that the smallest signal difference to be detected will create a magnetic force sufficient, or nearly so, to switch a core from one stable state to the other.

The operation of the matrix will best be understood by considering specific examples. Let it be assumed that four positive, constant, direct currents W, X, Y and Z whose magnitudes are respectively 3 units, 5 units, 1 unit and 7 units are to be compared. Let it further be assumed that 1 unit of current passing through any of the windings 12, 13, 22 or 30 will create a force sufficient to drive a core 11 from one of its remanence states to the other. The cores 11 of all cells 10 and 10*a* are initially in the 0 state.

At a time T1 the four currents W–Z are applied to the input terminals 18–21 to energize the input windings of several cells 10. As indicated by the polarity dots and by the arrow 55 in FIGURE 2, the currents energize the *row* input windings 13 of the respective row cores in a direction to drive the cores further into the 0 state to negative saturation, $-B_S$. The same currents pass through the *column* input windings 12 in a direction to drive the column cores 11 to the 1 state, as shown by the arrow 56 in FIGURE 2. *Therefore, in each of the cells 10 a net force proportional to the difference between the row and column currents acts upon the core 11.* If the net force is positive (column current exceeds row current) the core will tend to be switched toward the 1 state, otherwise it will remain in the 0 state. With this arrangement, failure of a core to switch may be taken as an indication that the column current does not exceed the row current. The answer desired from each comparing cell is, however, not only that the column current does not exceed the row current but whether the column current is smaller than the row current. By supplying through the bias windings a fixed force which is additive to the column force, this answer may be obtained. Therefore, at the time T1 the bias current generator is activated to supply current of predetermined magnitude to the bias coil. As shown by the dots on windings 23 in FIGURE 1 and by the arrow 57 in FIGURE 2 this current creates a force which aids the column current force in each cell 10. With the inclusion of the bias, a core 11 will be switched unless the row current is equal to or greater than the column current plus the bias current. Failure of a core to switch therefore indicates:

(1) That the column current is smaller than the row current and (2) That the row current exceeds the column current by at least the magnitude of the bias.

By varying the bias magnitude, different comparison conditions may be established. By providing different amounts of bias in different cells of the same matrix, specialized comparisons may be effected.

With this understanding of the operation of the cells 10 consider the various forces which are generated in the matrix when the currents W, X, Y and Z are applied. Table I below indicates the net difference force in each cell 10 for the example under consideration. It is assumed in this example that the bias current is equal to 1 unit.

*Table I*

| | B (1 unit) $C_w$ (3 units) + | B(1 unit) $C_x$ (5 units) + | B (1 unit) $C_y$ (1 unit) + | B (1 unit) $C_z$ (7 units) + |
|---|---|---|---|---|
| $R_w$ (3 units) − | ---------- | +3 | −1 | +5 |
| $R_x$ (5 units) − | −1 | ---------- | −3 | +3 |
| $R_y$ (1 unit) − | +3 | +5 | ---------- | +7 |
| $R_z$ (7 units) − | −3 | −1 | −5 | ---------- |

At a time T2 the inputs are removed and bias generator 25 is deactivated by suitable control means (not shown). All cores having received net positive forces are in the 1 state, and those having received negative forces or no forces remain in the 0 state. From the table above it will be seen that at least one core 11 of a cell 10 in each column except $C_y$ received a positive net difference force of one unit or more and was switched thereby to the 1 state.

To determine the smallest of the several input currents it is only necessary to examine the cells 10 of the several columns. In each column other than that associated with the smallest current, at least one cell 10 must have had a column input which, when added to the bias, overcame the negative force due to the row input and switched the core to the 1 state. Therefore, the column having no core 11 in the 1 state must represent the smallest current. Examination of Table I shows that at least one core 11 in every column except $C_y$ has been switched to the 1 state. Column $C_y$ thus represents the smallest input current, namely input Y of 1 unit magnitude.

The fact that no core 11 of a cell 10 in column $C_y$ is in the 1 state further indicates that the input Y is smaller than all others by at least the fixed amount of the bias. If no column has a core 11 remaining in the 0 state after input time, then no input signal was sufficiently smaller than the others to satisfy the comparison conditions.

Considering now the cells 10*a* in the several columns, it will be noted that at time T1 each cell 10*a* receives a positive column input through its input winding 12 in the same manner as the cells 10. To compare these inputs with the standard, signal generator 28 (the standard pulse source) is activated by suitable controls (not shown) concurrently with the application of signals W–Z. Current of predetermined magnitude is sent thereby through the coil 27 to energize windings 26. This current is in a direction to create a negative magnetic force as shown by arrow 58 in FIGURE 2. If the current flowing in column winding 12 of any cell 10*a* exceeds the standard current, the core 11 of that cell will be switched to the 1 state. Therefore, failure of the core to switch indicates that the column current is equal to or smaller than the predetermined standard. The cells 10*a* thus characterize their respective column inputs with respect to the predetermined standard. By suitable adjustment of the output of the standard pulse source generator 28, any desired standard of characterization may be established. It will be assumed for the purposes of the present example that the standard is 4 units of current. Referring to Table II below, it will be seen that the cells 10*a* of columns $C_w$ and $C_y$ have a net negative force produced by their inputs while the cells 10*a* of columns $C_x$ and $C_z$ have a net positive force. The cores of these latter two cells 10*a* are thus switched to the 1 state.

*Table II*

| | $C_w$(3 units) | $C_x$(5 units) | $C_y$(1 unit) | $C_z$(7 units) |
|---|---|---|---|---|
| Coil 27 (4 units) | −1 | +1 | −3 | +3 |

Readout of the comparison and characterization results stored in the matrix may be accomplished in several ways. A preferable method is to interrogate the cells 10 and 10*a* by rows by sequential activation of the interrogation coils 32–35. With this method only one core in a column is read at any given time and unwanted noise generation is kept to a minimum. Consider, for example, that the generator 36 is activated first during readout. A read current is caused to flow therefrom through coil 32 to create forces in the upper row of cores in the direction shown by arrow 59 in FIGURE 2. The read current is made large enough to switch the cores 11 from the 1 state to the 0 state. The upper cores 11 of columns $C_x$ and $C_z$ are thus returned to the 0 or reset state, producing substantial outputs in sense coils $S_x$ and $S_z$. These outputs, suitably amplified, are passed through gates 46 and 48, opened during read time by application of a control pulse to gate line 49, to the triggers 51 and 53. Triggers 51 and 53 are switched to the OFF state, indicating immediately that neither signal X nor signal Z was the smallest. The upper cores 11 of columns $C_w$ and $C_y$ are driven by the read pulse from the 0 state toward negative saturation and do not experience a flux reversal. Only minor voltages are induced thereby into the sense coils $S_w$ and $S_y$ and no appreciable signals are presented to the triggers 50 and 52. These triggers remain ON.

Activation of the pulse generator 37 for the second row of cores 11 resets all cores in that row formerly in the 1 state. Reference to Tables I and II shows that again signals are induced only in sense coils $S_x$ and $S_z$. Since triggers 51 and 53 have already been turned OFF, these signals have no effect. When pulse generator 38 is activated, however, the core 11 common to row $R_y$ and column $C_w$ is switched from the 1 state to the 0 state. The resulting signal in coil $S_w$ is amplified and applied to trigger 50 to switch it OFF. Only trigger 52 remains ON.

The final read pulse generator 39 is next activated. The only core switched thereby is core 11 common to row $R_z$ and column $C_z$. The output from this core has no effect since trigger 53 is already OFF.

At the end of the readout or interrogation operation trigger 52 remains ON, indicating that no core in column $C_y$ had been switched to the 1 state during read-in and, therefore, that:

(1) Signal Y is smaller than all others,
(2) Signal Y differs from each other by at least 1 unit,
(3) Signal Y does not exceed the standard signal.

In the foregoing example there existed a signal sufficiently smaller than the others to produce a proper indication. If, however, no signal had been smaller than all others by the amount of the bias current, then at least one core 11 in each column will be driven to the 1 state during read-in, and all triggers will be turned OFF during readout.

FIGURE 3 of the drawings illustrates a modified form of the invention wherein each cell 10 is adapted to indicate whether or not the column current is smaller than the row current by a proportional amount rather than by a fixed amount. The major components of the embodiment of FIGURE 3 are identical to those of FIGURE 1 and like reference characters are accordingly employed to indicate them. In this embodiment, however, no bias coil or generator is provided. An effect similar in concept to that provided by the bias coil is provided by increasing the number of turns of the column input winding 12′ of each comparing cell 10. A turns ratio equivalent to the approximate proportion by which the smallest current should differ from the next larger current is thus provided between the winding 12′ and the winding 13 in each cell 10. For example, if it is desired to characterize an input as the smallest only if the next larger is at least twice as large, then each winding 12′ is made to have twice as many turns as the row windings 13. A unit of current flowing through a winding 12′ thus creates twice as large a magnetic force as a unit flowing through a winding 13. A core 11 will be switched from the 0 state to the 1 state in response to the current through its winding 12′ unless the negative current flowing in its row winding (which is oppositely polarized) is approximately twice the magnitude of the column current. Failure of a core to switch may, therefore, be taken as an indication that the column current is proportional smaller than the row current by a factor of approximately 2. Different turns ratios will provide different proportional factors.

It will be understood that different turns ratios may be provided in different cells of the same matrix, if desired. Moreover, the teachings of FIGURES 1 and 3 may be combined to provide specialized comparisons. For example, by employing the proper turns ratio between the row and column inputs and by also employing a fixed bias, a matrix may be conditioned to indicate whether any input smaller than all others by, say a factor of 3 plus *n* units.

In the embodiments hereinbefore described, the matrix is arranged to indicate the smallest of several currents. It will be understood that the same combination of elements may be employed to indicate the largest of a group. By reversing the polarities of the row and column windings 12 and 13 or 12′ and 13 in the cells 10 this result may be achieved. In the hysteresis diagram of FIGURE 4, the relation of forces in the magnetic core 11′ of a cell so arranged is shown. Consider again that the core 11′ is in the 0 remanence state. An input current applied to the row windings creates a force in the direction of arrow 60 tending to switch the core to the 1 state. An input current applied to the column windings creates a force in the direction of the arrow 61 tending to maintain the core in the 0 state. Only if the column current is equal to or greater than the row current will the core remain in the initial state. Failure of the core to switch thus indicates that the column current is at least equal to the row current. By providing a bias force in the direction of the arrow 62 to aid the force due to the row current, the core may be made to switch for all cases except where the column current exceeds the row current by at least a fixed amount.

If a proportional difference between signals is to be indicated rather than a fixed difference, the number of turns of the row winding in each cell 10 may be increased and the bias may be omitted.

A system of column sense coils, amplifiers and triggers, may be employed as in FIGURE 1 to indicate, as in the first described embodiment, which, if any, column contains no cores in the 1 state. The column meeting this requirement represents the largest input signal.

Characterization of the inputs with respect to a standard signal may also be accomplished by poling the standard signal input winding of each cell 10*a* so that the standard current creates a force in the direction of arrow 63 in FIGURE 4. The column input winding to each cell 10*a* is poled to create a force in the direction of arrow 61.

An alternate system for indicating the largest of a group of inputs may be provided by employing the matrix arrangement as shown in FIGURE 1 but examining the cells by rows instead of by columns. Examination of Table I will show that while the column having no core in the 1 state after read-in represents the smallest input signal, the row having no core in the 1 state indicates the largest input signal.

Figure 5:
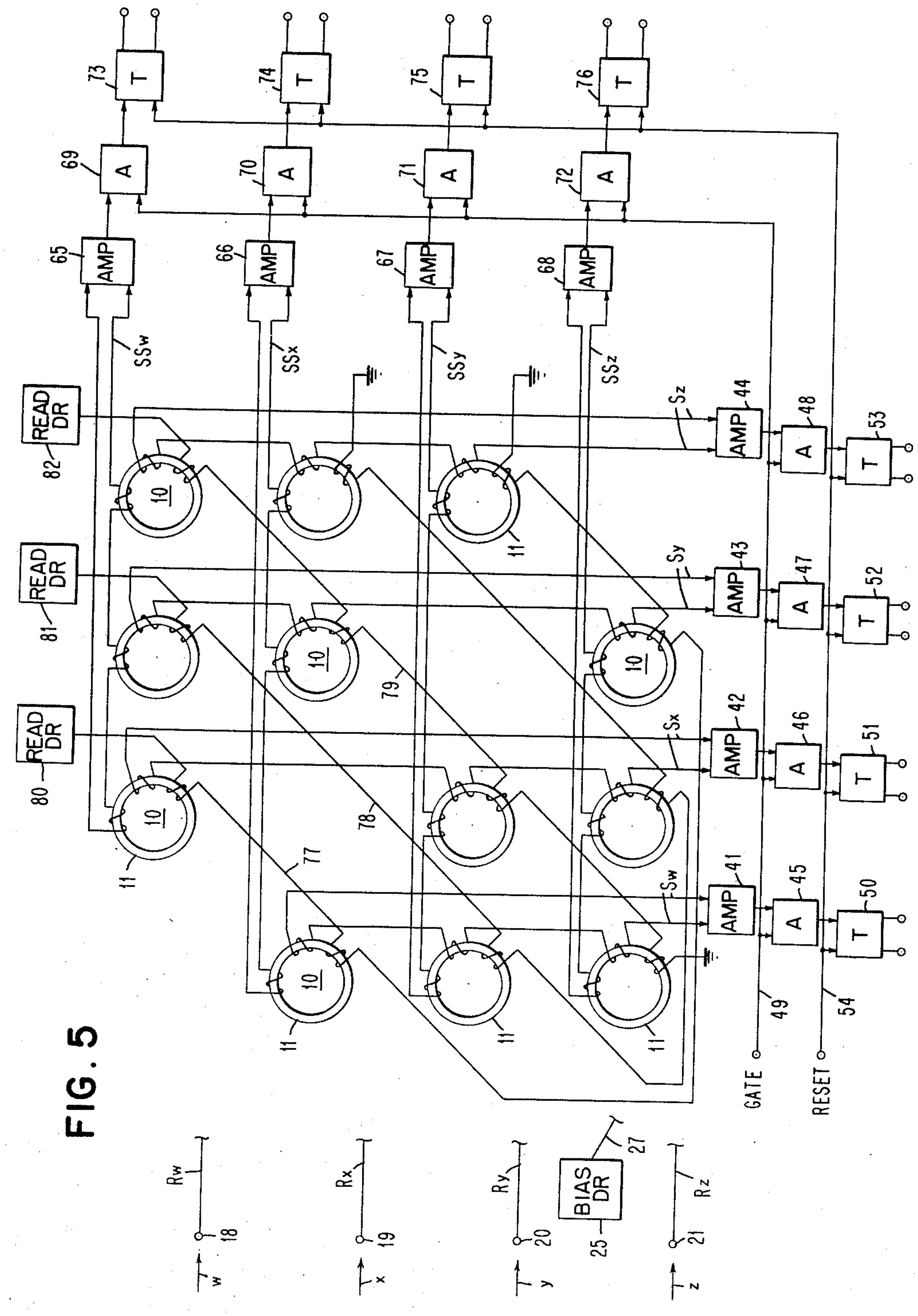
FIGURE 5 is a partial circuit diagram of a further modification of the invention wherein means are provided to identify both the largest and smallest input signal.

If row-oriented sense coils $SS_w$, $SS_x$, $SS_y$, $SS_z$, coupling all cells 10 of each different row, are added to the matrix as shown in FIGURE 5, together with amplifiers 65–68, gates 69–72, and triggers 73–76 both the largest and smallest signals may be identified in a single operation. In FIGURE 5, the row coils $R_w$–$R_z$, the column coils $C_w$–$C_z$, and the bias coils 27 have been omitted for the sake of clarity. It will be understood that in an actual embodiment, they will be provided in the manner shown in FIGURE 1. The read-out means shown in FIGURE 5 consists of read coils 77, 78 and 79 each of which passes diagonally through the matrix to couple one core in each different row and column. Generators 80, 81 and 82 energize the coils 77–79. With this winding arrangement, only one core coupled to any given sense coil $S_W$–$S_Z$, or $SS_W$–$SS_Z$ is reset at one time, and unwanted noise generation is minimized. Reading may, of course, be accomplished in other ways if desired. For example, all cores 11 may be read at once. In such a case, however, there is a danger that the additive effects of noise in cores not actually being switched may create a false signal.

It will be apparent from thef oregoing description and drawings, that the improved comparing and characterizing matrix provides a simple and efficient means for comparing and characterizing any number of input signals. The use of bistable magnetic cores as the comparing devices provides for accuracy and reliability as well as simplicity and ease of manufacture. With proper selection of components, it is possible to provide a matrix wherein the several windings consist of single turns only, thus permitting assembly of the device with the relative ease and facility known in the construction of magnetic memory matrices. It is to be understood, however, that other bistable elements capable of comparing signals one against another may be employed as well.

While the invention has been particularly shown and described with reference to preferred embodiment thereof, it will be understood by those skilled in the art that various changes in form and details may be made therein without departing from the spirit and scope of the invention.

What is claimed is:

1. Means for comparing a plurality of input signals comprising a plurality of comparing cells arranged in rows and columns, there being one row and one column associated with each different input signal, said comparing cells having first and second input means and being operable to provide an indication of the relation of a signal applied to one of said input means with a signal applied to the other of said input means, means for applying each input signal to the first input means of at least some of the cells in the column associated with that input signal, means to apply each input signal to the second input means of at least some of the cells in the row associated with that input signal, and means responsive to the indications provided by said cells for determining the relation of said input signals.

2. The invention defined in claim 1 wherein the means responsive to the indications provided by said cells includes a plurality of separate responsive means each common to all of the cells of a different column.

3. Means for comparing a plurality of input signals comprising a plurality of comparing cells arranged in rows and columns, there being one row and one column associated with each different input signal, said comparing cells having first and second input means and being operable to provide an indication if a signal applied to one of said input means exceeds a signal applied to the other of said input means, means for concurrently applying each said input signal to the first input means of those cells in the column associated with that input signal which are common to a row associated with a different input signal, means for concurrently applying each said input signal to the second input means of those cells in the row associated with that input signal which are common to a column associated with a different input signal, and means responsive to the indications provided by the cells for determining the relation of the input signals.

4. Means for comparing a plurality of input signals comprising a plurality of comparing cells arranged in rows and columns, there being one row and one column associated with each different input signal, said comparing cells having first and second input means and being operable to provide an indication if a signal applied to said second input means exceeds a signal applied to said first input means, means for concurrently applying each said input signal to the first input means of those cells in the column associated with that input signal which are common to a row associated with a different input signal, means for concurrently applying each said input signal to the second input means of those cells in the row associated with that input signal which are common to a column associated with a different input signal, and means responsive to the indications provided by the cells for indicating the relation of the input signals.

5. Means for comparing a plurality of input signals comprising a plurality of comparing cells arranged in rows and columns, there being one row and one column associated with each different input signal, said comparing cells having first and second input means and being operable to provide an indication if a signal applied to said first input means exceeds a signal applied to said second input means, means for concurrently applying each said input signal to the first input means of those cells in the column associated with that input signal which are common to a row associated with a different input signal, means for concurrently applying each said input signal to the second input means of those cells in the row associated with that input signal which are common to a column associated with a different input signal, and means responsive to the indications provided by the cells for indicating the relation of the input signals.

6. An electrical circuit comprising a plurality of magnetic cores arrayed in rows and columns, a plurality of row coils each associated with a different row of cores and inductively coupled to at least some of the cores in the associated row, a plurality of column coils each associated with a different column of cores and inductively coupled to at least some of the cores of the associated column, means connecting each row coil in series with a different one of said column coils, and a plurality of separate sensing coils each associated with a different column of cores and inductively coupled to at least some of the cores in the associated column.

7. A matrix for comparing a plurality of input signals comprising a plurality of bistable magnetic cores arrayed in rows and columns, there being one row and one column associated with each input signal, a plurality of row coils each associated with a different row of cores and inductively coupled at least to those cores of the associated row which are common to columns associated with different input signals, a plurality of column coils each associated with a different column of cores and inductively coupled at least to those cores of the associated column which are common to rows associated with different input signals, means connecting the row and column coils associated with the same input signal in series opposition, means for concurrently applying a different input signal to each of said series-connected row and column coils to magnetically excite the cores coupled thereto, and means for detecting changes of state of said cores in response to said excitation.

8. The invention defined in claim 7 wherein the means to detect changes of state of said cores comprises means for driving all cores to a predetermined state, a plurality of sense coils each coupled to cores of a different column wherein voltages are induced upon change of the associated cores from another state to the predetermined state, and a separate responsive device coupled to each sense coil for indicating the presence of said induced voltages in said sense coils.

9. A matrix for comparing a plurality of input signals comprising a plurality of bistable magnetic cores arrayed in rows and columns, there being one row and one column associated with each input signal, a plurality of row coils each associated with a different row of cores and inductively coupled at least to those cores of the associated row which are common to columns associated with different input signals, a plurality of column coils each associated with a different column of cores and inductively coupled at least to those cores of the associated column which are common to rows associated with different input signals, for applying each said input concurrently to the row coil and the column coil associated therewith in directions such that the magnetic forces caused by current in the column coils oppose the forces caused by current in the row coils, each core being excited in proportion to the difference between said forces, and means for detecting changes of state of said cores in response to said excitation.

10. A matrix for comparing and characterizing a plurality of input currents comprising a plurality of bistable magnetic cores arrayed in rows and columns, there being one row and one column associated with each input current, separate column coils each inductively coupled to all of the cores in a different column, separate row coils each inductively coupled to all cores except one in a different row, the one core in each row not coupled to the associated row coil being common to the column associated with the same input signal, means coupling the row and column coil associated with the same input signal in series opposition, means for applying said input currents to their associated series-connected row and column coils to create magnetic forces for exciting the cores, the forces due to current in the column coils opposing the forces due to current in the row coils, bias force creating means coupled to certain of said cores for aiding the force produced by one of said opposing forces, resetting means operable subsequent to application of said input currents for returning said cores to the initial state, and separate sense coils each coupled to the cores of a different column for detecting changes of state of said cores during operations of said resetting means.

11. A matrix for comparing and characterizing a plurality of input currents comprising a plurality of bistable magnetic cores arrayed in rows and columns, there being one row and one column associated with each input current, separate column coils each inductively coupled to all of the cores in a different column, separate row coils each inductively coupled to all cores except one in a different row, the one core in each row not coupled to the associated row coil being common to the column associated with the same input signal, means coupling the row and column coil associated with the same input signal in series opposition, means for applying said input current to their associated series-connected row and column coils to create magnetic forces for exciting the cores, the forces due to current in the column coils opposing the forces due to current in the row coils, bias force producing means coupled to the one core in each row which is not coupled to a row coil, said bias force producing means producing a force in said cores in opposition to the forces produced by current flowing in the column coils, resetting means operable subsequent to application of said input currents for returning the cores in said matrix to the initial state, and separate sense coils each coupled to the cores of a different column for detecting changes of state of said cores during operation of said resetting means.

References Cited in the file of this patent

UNITED STATES PATENTS

| | | |
|---|---|---|
| 2,745,090 | Grillo | July 24, 1952 |
| 2,973,508 | Chadurjian | Feb. 28, 1961 |
| 2,996,701 | David | Aug. 15, 1961 |